United States Patent [19]

Yanagisawa

[11] Patent Number: 5,223,875
[45] Date of Patent: Jun. 29, 1993

[54] AUTOMATIC TRACKING CAMERA SYSTEM
[75] Inventor: Masaru Yanagisawa, Tokyo, Japan
[73] Assignee: Canon Kabushiki Kaisha, Tokyo, Japan
[21] Appl. No.: 753,214
[22] Filed: Aug. 30, 1991
[30] Foreign Application Priority Data
  Sep. 6, 1990 [JP] Japan .................. 2-236626
[51] Int. Cl.⁵ .................. G03B 17/38; H04N 5/225
[52] U.S. Cl. .................. 354/266; 354/81; 358/125
[58] Field of Search .................. 354/131, 266, 81; 367/127; 358/108, 125

[56] References Cited

U.S. PATENT DOCUMENTS

| 4,937,604 | 6/1990 | Yoshida et al. | 354/266 |
| 4,980,871 | 12/1990 | Sieber et al. | 367/127 |
| 5,012,335 | 4/1991 | Cohodar | 354/81 |
| 5,119,123 | 6/1992 | Tominaga et al. | 354/131 X |

FOREIGN PATENT DOCUMENTS 62-288800 5/1990 Japan .
1-89771 11/1990 Japan .
2-280129 11/1990 Japan .

Primary Examiner—Michael L. Gellner
Assistant Examiner—J. K. Han
Attorney, Agent, or Firm—Robin, Blecker, Daley & Driscoll

[57] ABSTRACT

A camera system which is controllable with a remote-control device is arranged to detect the incoming flight direction of a signal sent from the remote-control device, to adjust the facing direction of the camera to the incoming flight direction of the signal, and to be capable of shifting the facing direction of the camera to a given direction according to an instruction signal coming from the remote-control device after the facing direction of the camera is adjusted to the incoming flight direction of the signal.

14 Claims, 10 Drawing Sheets

FIG.7
| OUTPUTS OF DECODER | | | CONDITIONS |
|---|---|---|---|
| a | b | c | |
| 1 | 0 | 0 | LEFT |
| 0 | 1 | 0 | CENTER |
| 0 | 0 | 1 | RIGHT |
| 1 | 1 | 1 | RELEASE |
| (OTHERS) | | | STANDBY |
FIG.8(a)
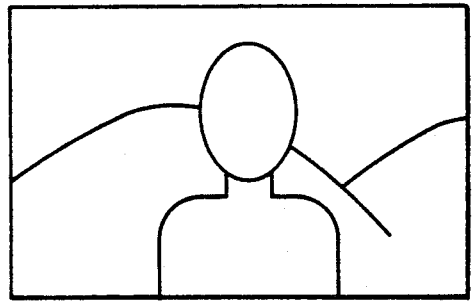
FIG.8(b)
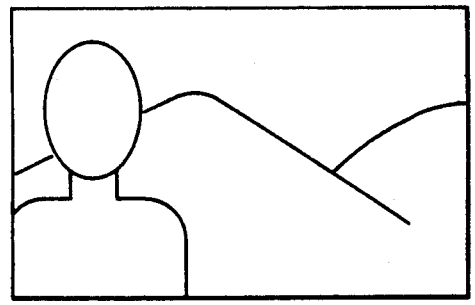
FIG.8(c)
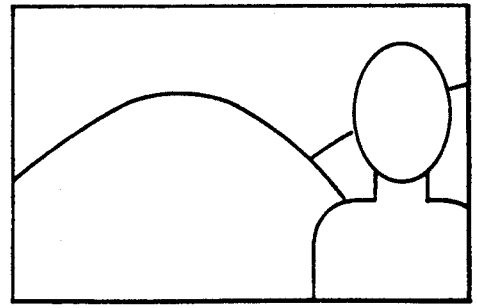

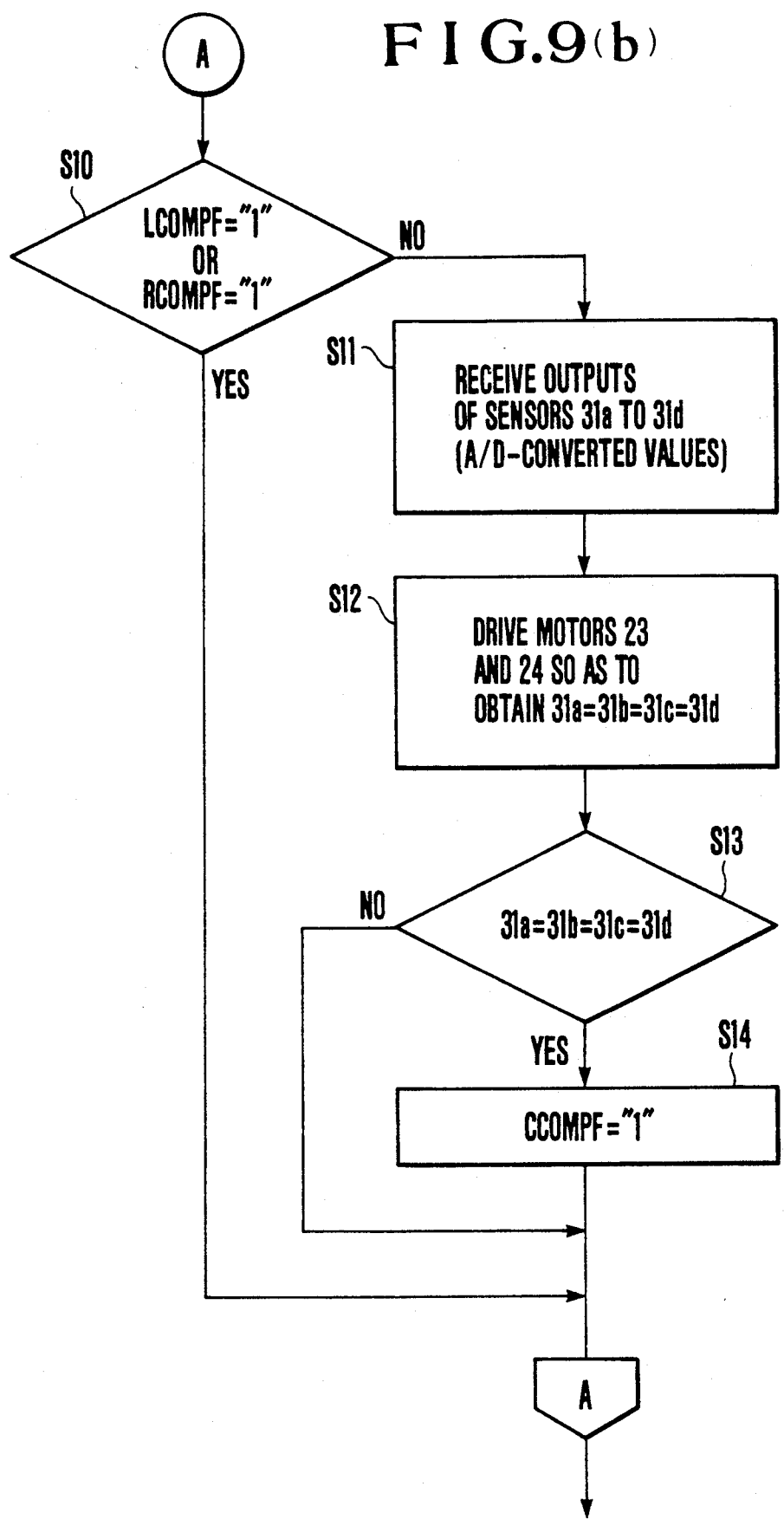

AUTOMATIC TRACKING CAMERA SYSTEM

BACKGROUND OF THE INVENTION

1. Field of the Invention

This invention relates to a photographing system which permits a remote operation and more particularly to a photographing system for a camera which is provided with a remote-control device.

2. Description of the Related Art

Many of the conventional cameras have been designed to permit use of a wireless remote-control device as an accessory.

The conventional wireless remote-control device is designed simply for the purpose of releasing the shutter of the camera at a distance from the camera. It has been, therefore, impossible with the conventional wireless remote-control device to change the facing direction of the camera, i.e., to reorient the camera, or to cause, under automatic or remote control, the facing direction of the camera to track or follow a moving object to be photographed.

Therefore, an automatic tracking device for causing the facing direction of the camera to automatically track a moving object and a remote-control type automatic tripod head device or the like have recently been proposed. These devices enable the facing direction of the camera either to be remotely-controlled or to be automatically caused to track the moving object.

With an object-tracking, wireless remote-control type photographing system designed on the concept of the known automatic tracking device, remote control over the camera is truly possible as the lens barrel of the camera is always directed to the object. However, with this photographing device, the object is located in the center of the picture plane for every one of the photographs taken. Therefore, the composition of the photograph thus taken becomes monotonous and tasteless.

SUMMARY OF THE INVENTION

One aspect of the invention lies in the provision of a wireless remote-control type photographing device for a camera which is arranged not only to permit a remote shutter release operation but also to vary the posture of the camera by a remote operation and, in addition to that, to permit taking a picture under remote control having an object to be photographed in the center of the picture plane.

Another aspect of the invention lies in the provision of a photographing device for a camera which, in addition to a function of automatically causing the camera to face the incoming flight direction of the signals, has another function of shifting the center of a photographing picture plane sideways by remote control after causing the camera to face the incoming flight direction of the signals.

The further aspects of this invention will become apparent from the following detailed description of an embodiment thereof taken in connection with the accompanying drawings.

BRIEF DESCRIPTION OF THE DRAWINGS

FIG. 7 shows the contents of camera operation signals sent from the signal sending side to the signal receiving side.

FIGS. 8(a), 8(b) and 8(b) show, by way of example, photographs which can be taken with the camera system of this invention.

FIGS. 9(a) and 9(b) are flow charts showing the operation of the camera system of this invention.

DETAILED DESCRIPTION OF THE PREFERRED EMBODIMENT

An embodiment of this invention is described below with reference to the drawings.

Figure 4:
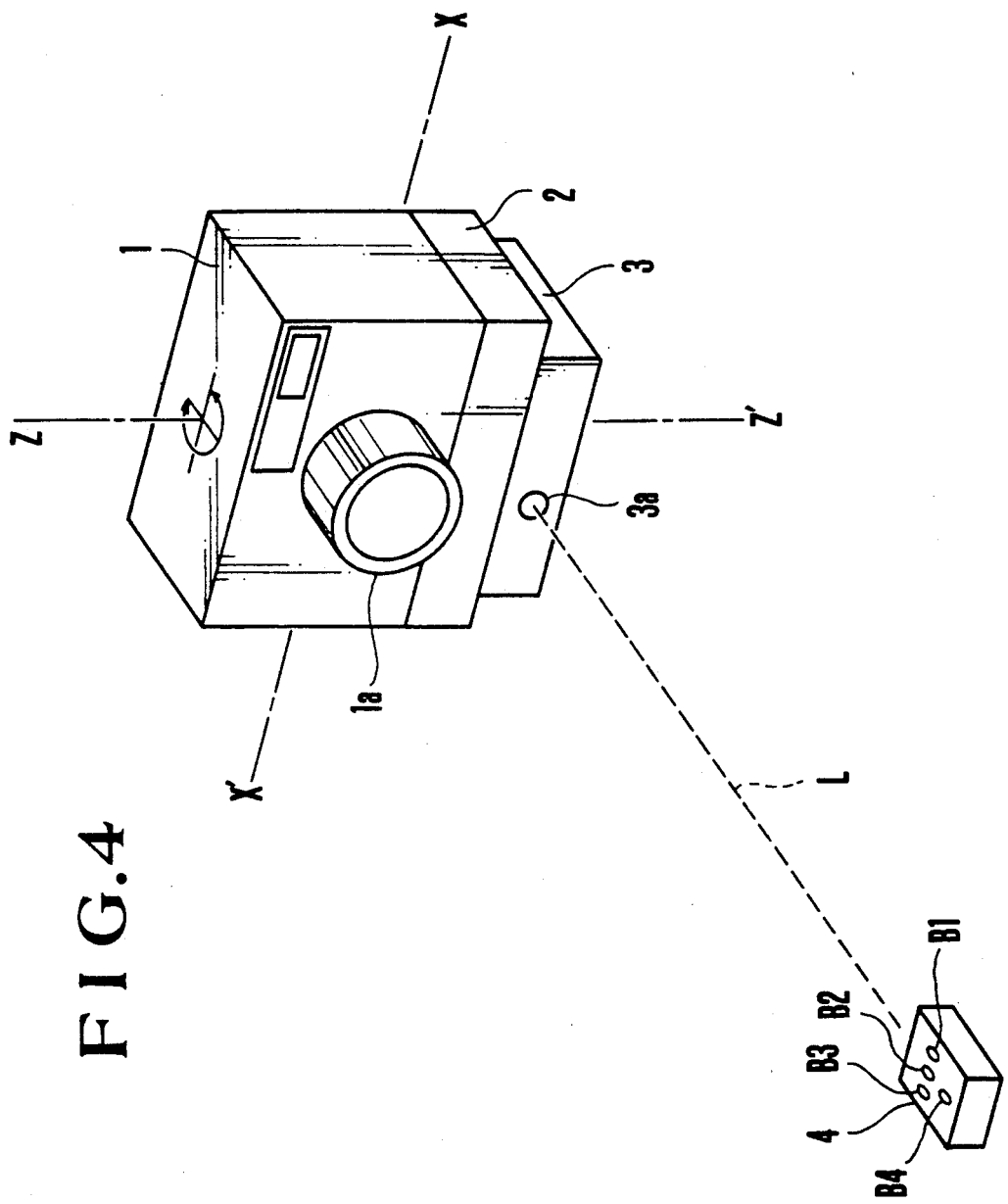
FIG. 4 shows in outline the arrangement of a camera system which is arranged as an embodiment of this invention.

FIG. 4 shows the appearance of the whole arrangement of a camera system of this invention. In FIG. 4, a reference numeral 1 denotes a camera body part which has a lens barrel 1a and other various photographing mechanisms. A reference numeral 2 denotes a camera posture varying device which is arranged integrally with the camera body part 1. The camera posture varying device 2 is arranged to be capable of turning the camera body part 1 not only on a horizontal axis X-X' which extends along the rear edge of the camera body part 1 but also on a vertical axis Z-Z'. A signal receiving device 3 is arranged either integrally with the camera body part 1 or integrally with the camera posture varying device 2. A wireless remote-control device 4 (a remote operation device with a signal transmitting function) is arranged to be operated by the photographer at a distance from the signal receiving device 3 and the camera body part 1.

Figure 2:
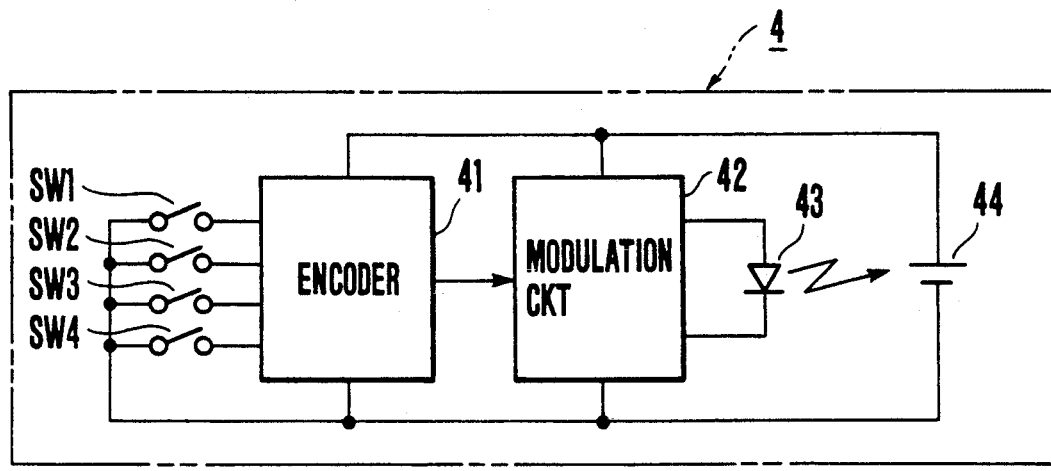
FIG. 2 shows, by way of example, an electrical arrangement on the signal sending side of the camera system according to this invention.

The wireless remote-control device 4 which is arranged to generate remote camera operation signals includes therein, as shown in FIG. 2, component parts including four switches SW1 to SW4; an encoder 41 which is arranged to form pulse signals encoded according to the acting states of the switches SW1 to SW4; a modulation circuit 42 which is arranged to modulate a carrier wave such as clock pulses or the like with the pulse signals; an LED 43 (an infrared ray emitting diode) which is arranged to be driven by the output of the modulation circuit 42; and a power supply 44. On the surface of the wireless remote-control device 4 are arranged pushbuttons B1 to B4 which correspond to the above-stated switches SW1 to SW4.

The switch SW1 which is interlocked with the push-button B1 is arranged as follows: the axis of a signal receiving window 3a of the signal receiving device 3 coincides with the direction of a transmitted signal L. That is, when an object to be photographed is located in the center of a picture plane as shown in FIG. 8(a) with the object assumed to be a person e.g., if switch SW1 is closed, an operation signal is generated to cause the camera body part 1 to turn clockwise (in FIG. 4) to a slight degree on the vertical axis Z-Z' to shift the object from the center to the left on the picture plane, so that the object is located on the left side of the picture plane as shown in FIG. 8(b). When the switch SW1 is closed, the encoder 41 generates a signal indicating a code "100" which consists of three digits.

The switch SW2 is interlocked with the push-button B2 and is provided for generating an operation signal to control the posture of the camera in such a way as to have the object in the center of the picture plane as shown in FIG. 8(a). When the switch SW2 is closed, the encoder 41 generates a three-digit code signal "010". With this code signal "010" generated, the posture of the camera is controlled in such a way as to cause the axis of the lens barrel 1a to coincide with the center of the object.

The switch SW3 is interlocked with the push-button B3 and is provided for generating an operation signal to control the posture of the camera in such a way as to have the object on the right side of the picture plane as shown in FIG. 8(c). When the switch SW3 is closed, the encoder 41 generates another three-digit code signal "001". In accordance with the code signal "001", the camera posture varying device 2 causes the camera body part 1 to turn counterclockwise, as viewed in FIG. 4, to a slight degree on the vertical axis Z-Z' from a posture in which the object is located in the center of the picture plane.

The switch SW4 is interlocked with the push-button B4 and is provided for generating a signal to cause a shutter release operation to be carried out. When the switch SW4 is closed, the encoder 41 generates a three-digit code signal "111".

The modulation circuit 42 is arranged to generate a modulated wave output which is obtained by modulating the carrier wave such as clock pulses with the output signal of the encoder 41 and to cause the LED 43 to make a light emission according to the modulated wave output. Then, an infrared ray signal L, which is obtained by the light emitting action of the LED 43, is projected toward the signal receiving device 3.

Figure 6A:
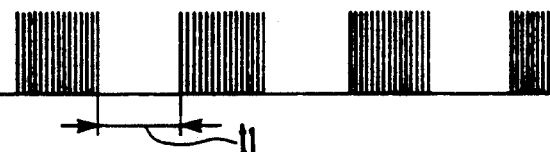
FIGS. 6(a), 6(b) and 6(c) show the details of signals to be transmitted from the signal sending side to the signal receiving side.
Figure 6B:
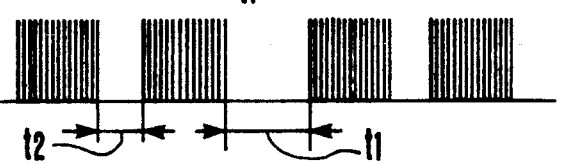
Figure 6C:
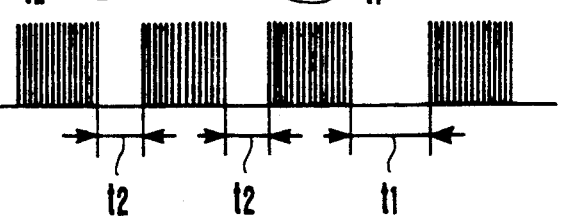

FIGS. 6(a) to 6(b) show the outputs of the modulation circuit 42 or those of the LED 43. Of these figures, FIG. 6(a) shows an output obtained when there is no transmitted data. In this instance, the output becomes pulse trains which are high-frequency-modulated at intervals of a constant time t1. FIGS. 6(b) and 6(b) show outputs obtained when a camera operation signal such as a shutter release operation signal or the like is sent. In that instance, only a necessary number of high-frequency-modulated pulse trains are generated at intervals of a time t2 which is shorter than the time t1. When the time interval of the pulse trains becomes t1, it indicates the end of data transmission. Then, the contents of the transmitted data can be decoded by counting the number of the pulse trains of the transmitted signal (or data) while detecting the interval between the pulse trains.

Figure 1:
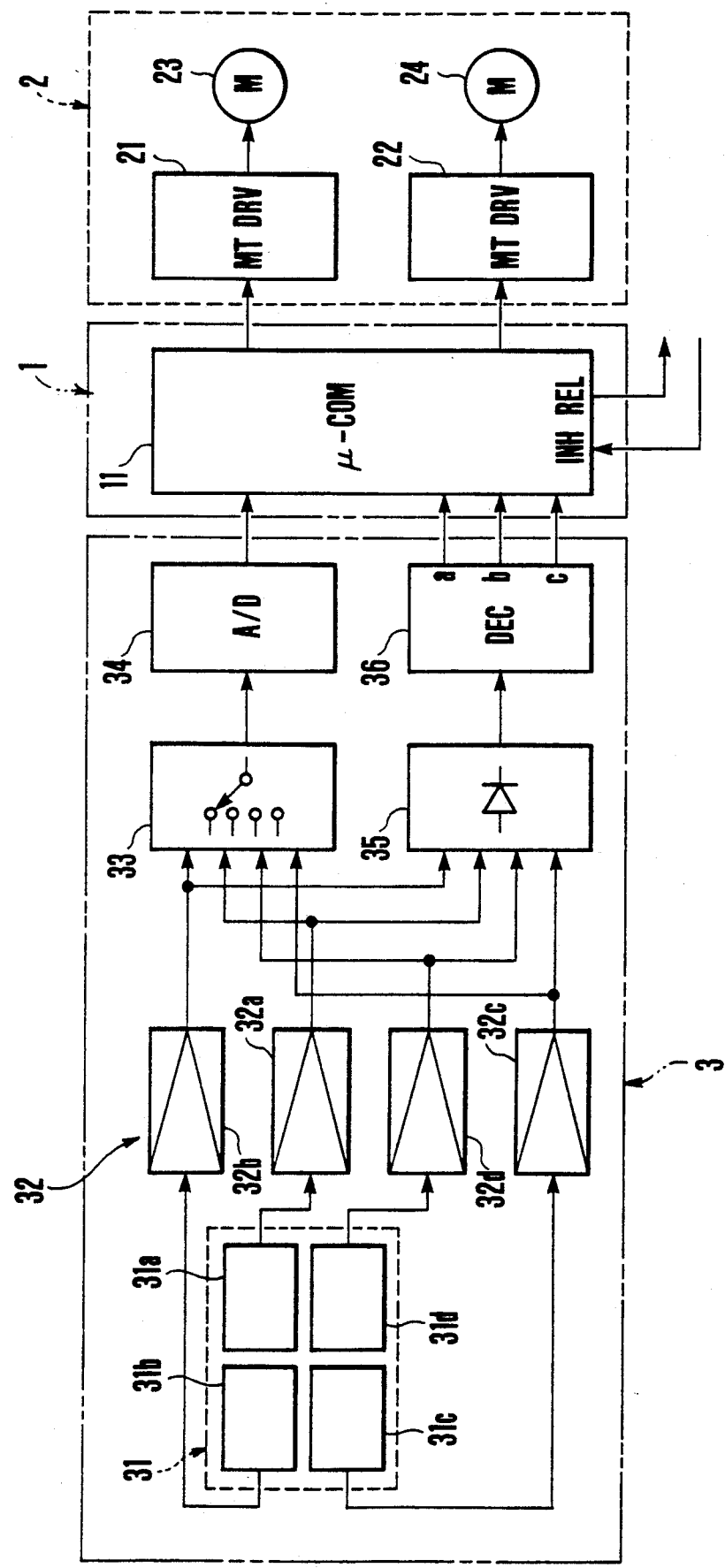
FIG. 1 shows, by way of example, an electrical arrangement on the signal receiving side of a camera system which is arranged according to this invention.
Figure 3:
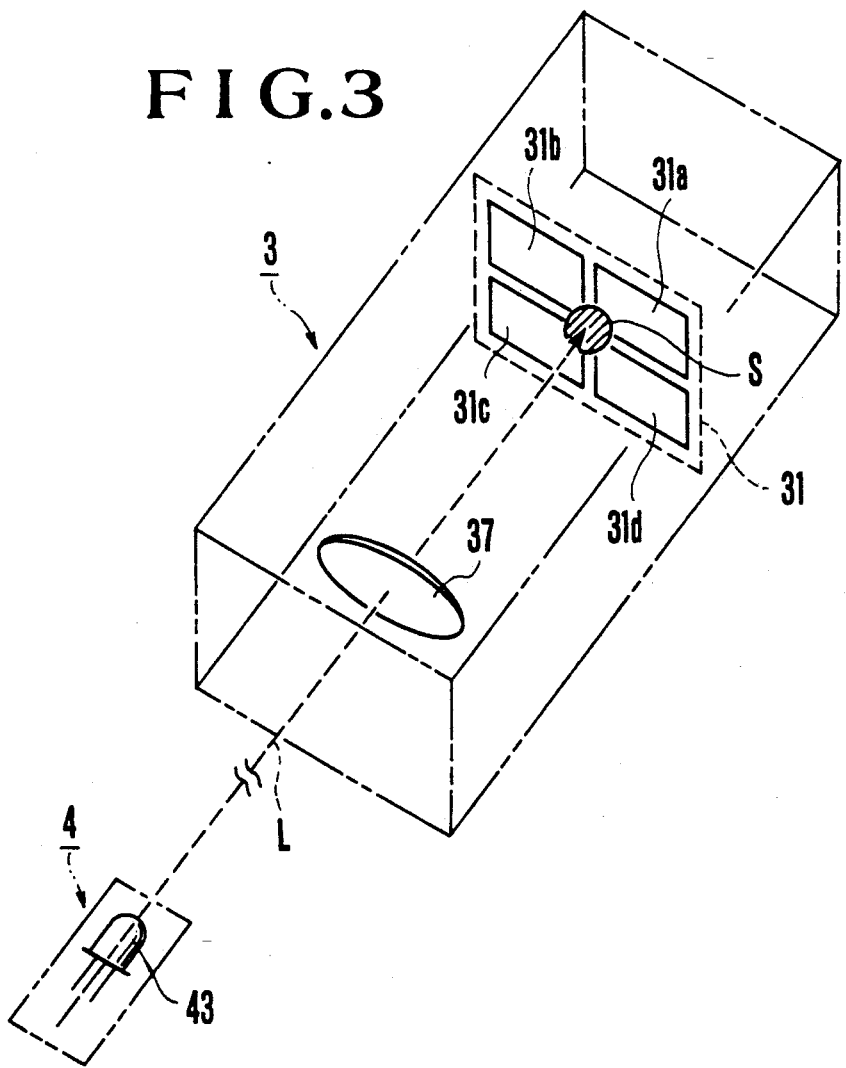
FIG. 3 shows in part the arrangement of the signal sending side and that of the signal receiving side of the same camera system.

As shown in FIG. 3, the signal receiving device 3 includes therein a signal light receiving lens 37 which is arranged to condense the infrared ray pulse signal emitted from the wireless remote-control device 4; and a photo-senser 31 which is arranged to generate an electrical output according to the incident amount of light passed through the lens 37. The signal receiving device 3 further includes, as shown in FIG. 1, an amplifier group 32 which is arranged to amplify the output of the sensor 31; a detection and waveform shaping device 35 which is arranged to demodulate the outputs of the amplifier group 32; a multiplexer 33 which is arranged to selectively take in the outputs of the amplifier group 32 in a serial manner; an A/D converter 34; a decoder 36, etc.

The photo-sensor 31 is a split type sensor which, as shown in FIGS. 5(a) to 5(d) and 1, consists of four divided sensors 31a to 31d covering a first quadrant to a fourth quadrant. Each of the divided sensors 31a to 31d is in a rectangular shape which is long sideways and is analogic with the shape of the light receiving surface of the photo-sensor 31. The divided sensors 31a to 31d are separated from each other across strip-like dead zones. Amplifiers 32a to 32d are connected to the output terminals of the corresponding divided sensors 31a to 31d respectively. The multiplexer 33 and the detection and waveform shaping device 35 are connected to the output terminals of the amplifiers 32a to 32d in parallel. The output of each of the amplifiers 32a to 32d is thus arranged to be taken into two channels of signal processing systems.

To the output terminal of the multiplexer 33 is connected the A/D converter 34. After having been serially taken in by the multiplexer 33, the outputs of the amplifiers 32a to 32d are converted into a digital signal by the A/D converter 34. The digital signal thus obtained is then supplied to a microcomputer 11.

In this embodiment, the microcomputer 11 is disposed within the camera body part 1. However, the microcomputer 11 may be disposed within the signal receiving device 3 instead of the camera body part 1.

The signal processing system consisting of the multiplexer 33, the A/D converter 34 and the microcomputer 11 forms received-signal position detecting means for detecting the position, on the light receiving plane of the photo-sensor 31, of the spot S of the transmitted signal L incident on the sensor 31. In addition to that, this signal processing system forms a part of the posture control means for the camera body part 1.

Figure 5A:
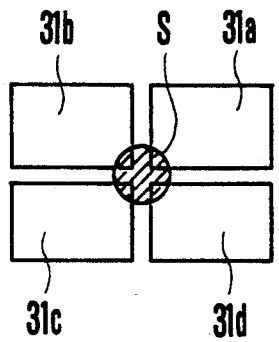
FIGS. 5(a), 5(b), 5(c) and 5(d) show a photo-sensor disposed on the signal receiving side of the same camera system as in relation to the incident position of a signal transmitted.

FIGS. 5(a) to 5(d) show, by way of example, the signal spot positions detected by the received-signal position detecting means. When the signal spot S is incident on a central part of the photo-sensor 31 as shown in FIG. 5(a), the outputs of the divided sensors 31a to 31d are equal to each other. In this instance, the microcomputer 11 determines that the transmitted signal is incident on the center of the light receiving plane of the signal receiving device 3.

Figure 5B:
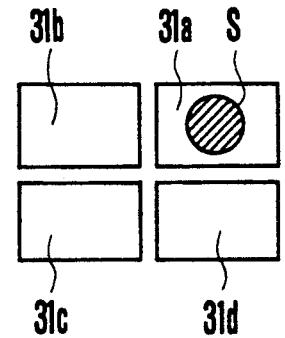
Figure 5C:
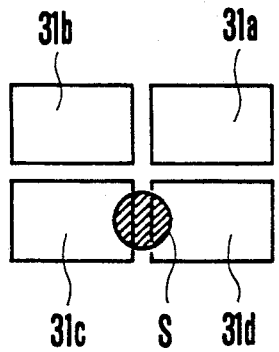

When the signal spot S is incident only on the divided sensor 31a of the first quadrant as shown in FIG. 5(b), an output corresponding to the whole area of the signal spot S is generated only by the divided sensor 31a. In that instance, therefore, the microcomputer 11 determines that the signal spot S is incident only on the divided sensor 31a of the first quadrant. Then, the microcomputer 11 detects a difference of the position of the signal spot S from the center of the photo-sensor 31.

When the incident signal spot S is straddling both the divided sensor 31c of the third quadrant and the divided sensor 31d of the fourth quadrant as shown in FIG. 5(b), the divided sensors 31c and 31d respectively generate their outputs according to their areas covered with the signal spot S. The microcomputer 11 then detects a difference of the incident position of the incident signal from the center position of the photo-sensor 31.

Figure 5D:
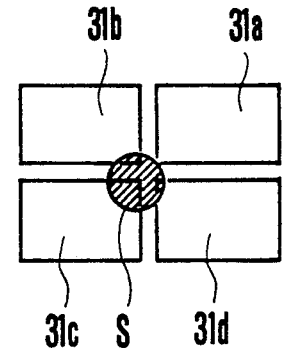

Further, if the incident signal spot S straddles the divided sensors 31b to 31d of the second to fourth quadrants as shown in FIG. 5(d), the divided sensors from the sensor 31b through the sensors 31d generate their outputs respectively according to their areas covered with the signal spot S. The microcomputer 11 then detects a difference of the incident position of the incident signal from the center of the photo-sensor 31.

The decoder 36 is connected to the output terminal of the detection and waveform shaping device 35. The output of the decoder 36 are arranged to be supplied to the microcomputer 11 of the camera body part 1. The signal processing system which consists of the detection and waveform shaping device 35, the decoder 36 and the microcomputer 11 forms operation signal kind determining means or operation signal decoding means. The outputs of the amplifiers 32a to 32d are taken in by the detection and waveform shaping device 35. At the detection and waveform shaping device 35, the outputs of the amplifiers 32a to 32d are demodulated by removing their carrier wave components before they are shaped. The outputs of the detection and waveform shaping device 35 are supplied to the decoder 36 to be brought back into the forms of the original encoded signals. More specifically, when only the switch SW1 is closed at the wireless remote-control device 4, a signal of a code "100" consisting of three digits is generated at the three output terminals a to c of the decoder 36 as shown in FIG. 7. When the switch SW2 is closed alone at the wireless remote-control device 4, a signal of a code "010" is generated at the output terminals a to c of the decoder 36. When the switch SW3 is closed alone at the wireless remote-control device 4, a signal of a code "001" is generated at the output terminals a to c of the decoder 36. Further, when the switch SW4 is closed alone at the wireless remote-control device 4, a signal of a code "111" is generated at the terminals a to c of the decoder 36.

The input and output ports INH and REL of the microcomputer 11 is connected to a shutter control circuit which is not shown. A signal indicating that the shutter is in action is arranged to be supplied from the shutter control circuit to the input port INH. A shutter release signal is arranged to be supplied from the output port REL to the shutter control circuit.

The camera posture varying device 2 is either fixedly or detachably attached to the camera body part 1 integrally therewith. The camera posture varying device 2 includes a motor 23 which is arranged to turn the camera body part 1 around the vertical axis Z-Z'; a motor 24 which is arranged to turn the camera body part 1 around the horizontal axis X-X'; and motor driving circuits 21 and 22 which control the power supply to the motors 23 and 24, respectively. The motor driving circuits 21 and 22 are connected to the output ports of the microcomputer 11 and are thus arranged to operate under the control of the microcomputer 11.

The microcomputer 11 is arranged to shift the posture of the camera body part 1 to the incoming flight direction of the signal or toward the object to be photographed by controlling the motor driving circuits 21 and 22 on the basis of information on the position of the signal spot S incident on the photo-sensor 31 and the contents of the operation signal supplied from the decoder 36. The microcomputer 11 is further arranged to cause a picture composition varying action to be performed according to the contents of the operation signal and to cause a shutter operation to be lastly performed.

The operation of the system of this embodiment is described as follows: the so-called automatic tracking action of the embodiment by which the lens barrel 1a of the camera body part 1 is directed to the incoming flight direction of the signal or toward the object has been almost clearly disclosed by the foregoing description. For further comprehension, however, the automatic tracking action is again briefly described here.

Figure 9A:
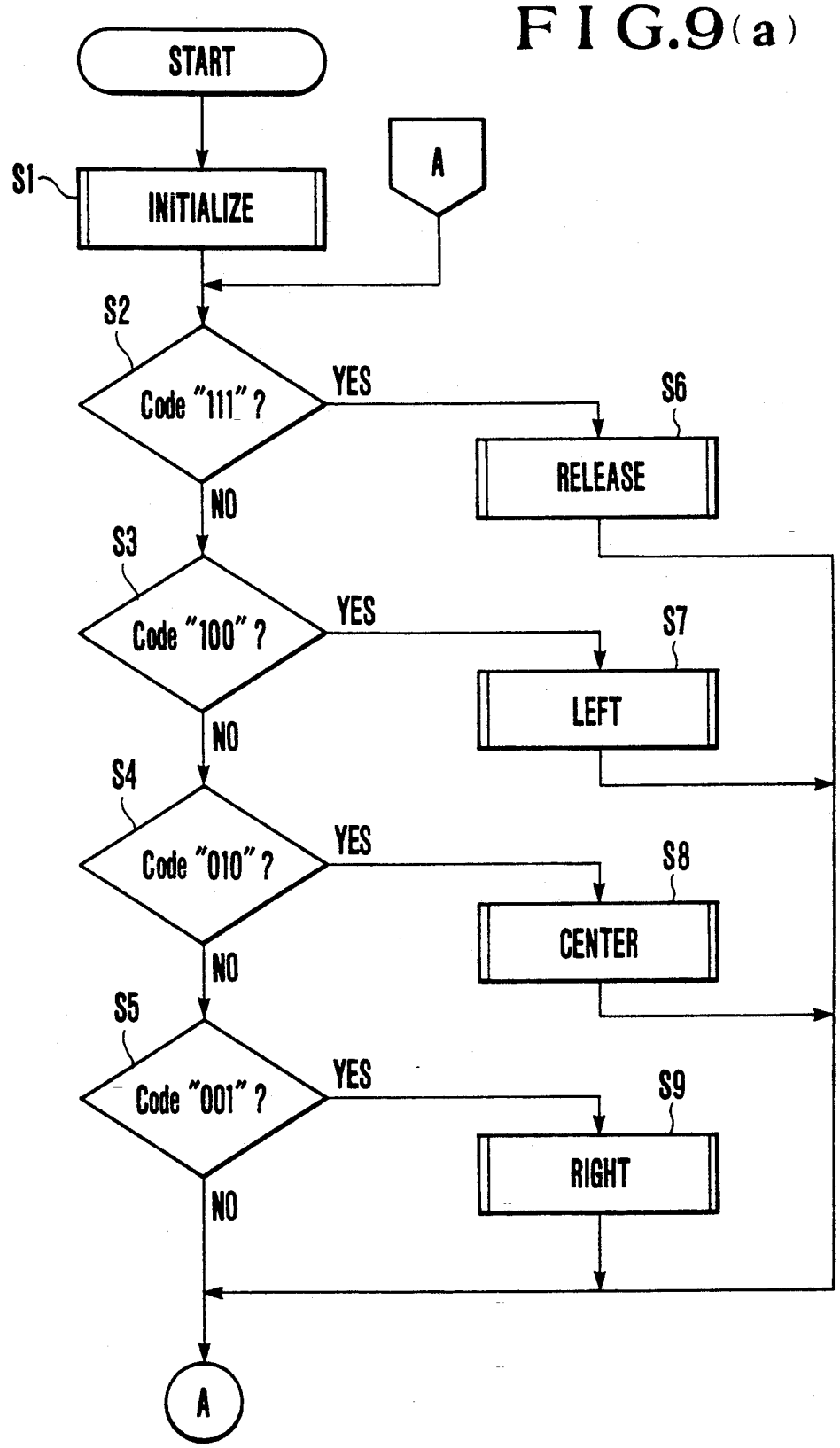

When the power supply switch (not shown) of the wireless remote-control device 4 is turned on, the spot S of the signal L is supplied from the wireless remote-control device 4 to the signal receiving device 3. The transmitted data thus supplied differs from the data obtained with the pushing of each of the above-stated buttons B1 to B4. After the signal spot S is received by the signal receiving device 3, a signal from the signal receiving device 3 causes the microcomputer 11 of the camera body part 1 to operate in accordance with the flow of operation which is as shown in FIGS. 9(a) and 9(b).

The data (or signal) transmitted when the power supply switch is turned on differs from the data of the buttons B1 to B4 as mentioned above. Therefore, in this instance, the flow proceeds to a step S11 through steps S1 to S5 and S10. At the step S11, the outputs of the sensors 31a to 31d (after they are amplified by the amplifiers 32a to 32d and digitized by the A/D converter 34 into digital signals) are obtained. At a step S12, the motors 23 and 24 are caused to be driven in such a manner as to make the outputs of the sensors 31a to 31d coincide with each other. The manner in which driving signals are given to the motors 23 and 24 is as follows: the motor 23 is caused to rotate in different directions according to whether the sensor outputs are in a relation of 31b>31d and 31d>31c or in a relation of 31a>31b and 31c>31d. Meanwhile, the other motor 24 is caused to rotate in different directions according to whether the sensor outputs are in a relation of 31b>31c and 31a>31d or in a relation of 31c>31b and 31d>31a.

At a step S13, a check is made to find if the outputs of the divided sensors 31a to 31d coincide with each other. If so, the flow comes to a step S14 to set a flag CCOMPF at "1". If not, the flow comes back to the step S2 of FIG. 9(a). The automatic tracking action is executed by repeating the above-stated flow of operation.

For example, if the spot S of the signal L which is projected from the wireless remote-control device 4 comes to be incident on the photo-sensor 31 in a manner as shown in FIG. 5(d), the three divided sensors 31b to 31d of the photo-sensor 31 generate outputs according to their areas covered with the signal spot S respectively. The outputs of the divided sensors 31b to 31d are serially taken in by the multiplexer 33 after completion of amplification by the amplifiers 32b to 32d. The outputs of the multiplexer 33 are converted into digital signals by the A/D converter 34. The outputs of the A/D converter 34 are taken in by the microcomputer 11. The microcomputer 11 then computes the amount of deviation of the center of the signal spot S from the center of the photo-sensor 31 by comparing the outputs of the divided sensors 31b to 31d with each other. The microcomputer 11 then sends driving signals to the motor driving circuits 21 and 22 which are disposed within the camera posture varying device 2. The motors 23 and 24 are rotated according to the driving signals. The camera body part 1 is then turned on the vertical axis Z-Z' and the horizontal axis X-X' to such an extents that corresponds to the driving signals. The motor 23 and 24 are stopped when the center of the signal spot S eventually comes to coincide with the center of the photo-sensor 31. As a result, the lens barrel 1a of the camera body part 1 is directed to the incoming flight direction of the signals or to the object to be photographed. This tracking action is automatically performed whenever the incident position of the signal spot S on the photo-sensor 31 of the signal receiving device 3 deviates from the center of the photo-sensor 31.

After completion of the automatic tracking action by which the lens barrel 1a of the camera body is directed to the center of the object or to the incoming flight direction of the signals, a picture composition varying action is performed to shift the position of the object sideways from the center of the picture plane at which the object is located.

Next, actions to be performed after the automatic tracking action are described with reference to control operation flow charts which are shown in FIGS. 9(a), 9(b) and 10 to 12. Further, before the description with reference to these flow charts, the contents of flags which are used in these flow charts are described with reference to the following table:

| Table showing Contents of Flags | |
|---|---|
| Names of Flags | Contents |
| LCOMPF: | A flag which indicates the end of leftward turning action on the camera body part in accordance with a control signal. |
| RCOMPF: | A flag which indicates the end of rightward turning action on the camera body part in accordance with a control signal. |
| CCOMPF: | A flag which indicates completion of the so-called tracking action performed by moving the camera in such a way as to make the axis of the lens barrel of the camera coincide with the center of the object. |

FIGS. 9(a) and 9(b) indicate a main routine of control actions to be executed by the microcomputer 11 in accordance with remote operation signals sent from the wireless remote-control device 4. In these figures, codes "111", "100", "010" and "001" represent respectively the outputs of the decoder shown in FIG. 7.

More specifically, the code "100" means an instruction "to shift the object to the left of the picture plane". The code "010" means an instruction "to have the object in the center of the picture plane". The code "001" means an instruction "to shift the object to the right of the picture plane". The code "111" means an instruction "to make a shutter release".

Figure 10:
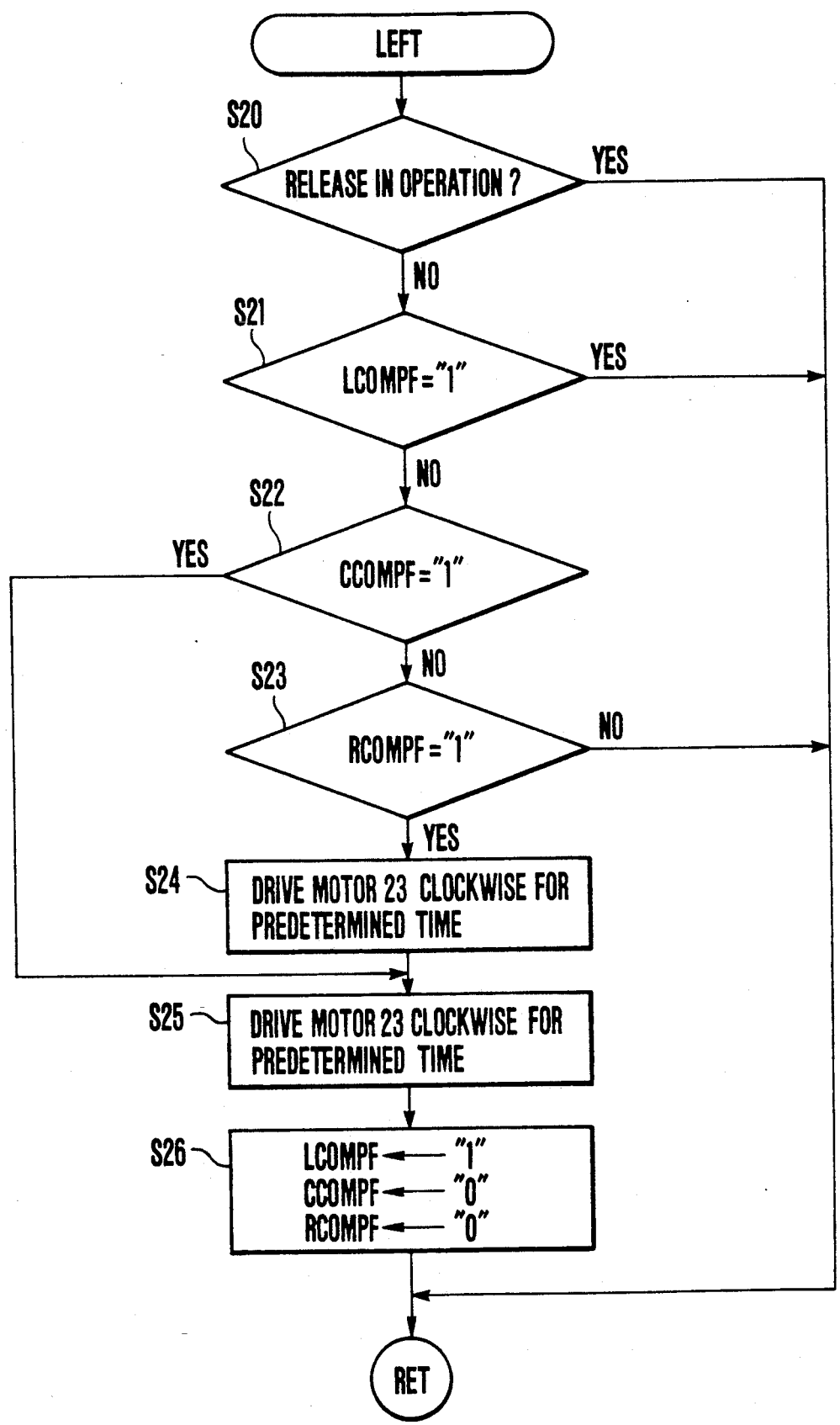
FIG. 10 is a flow chart showing a subroutine LEFT included in the flow of operation shown in FIG. 9(a).
Figure 11:
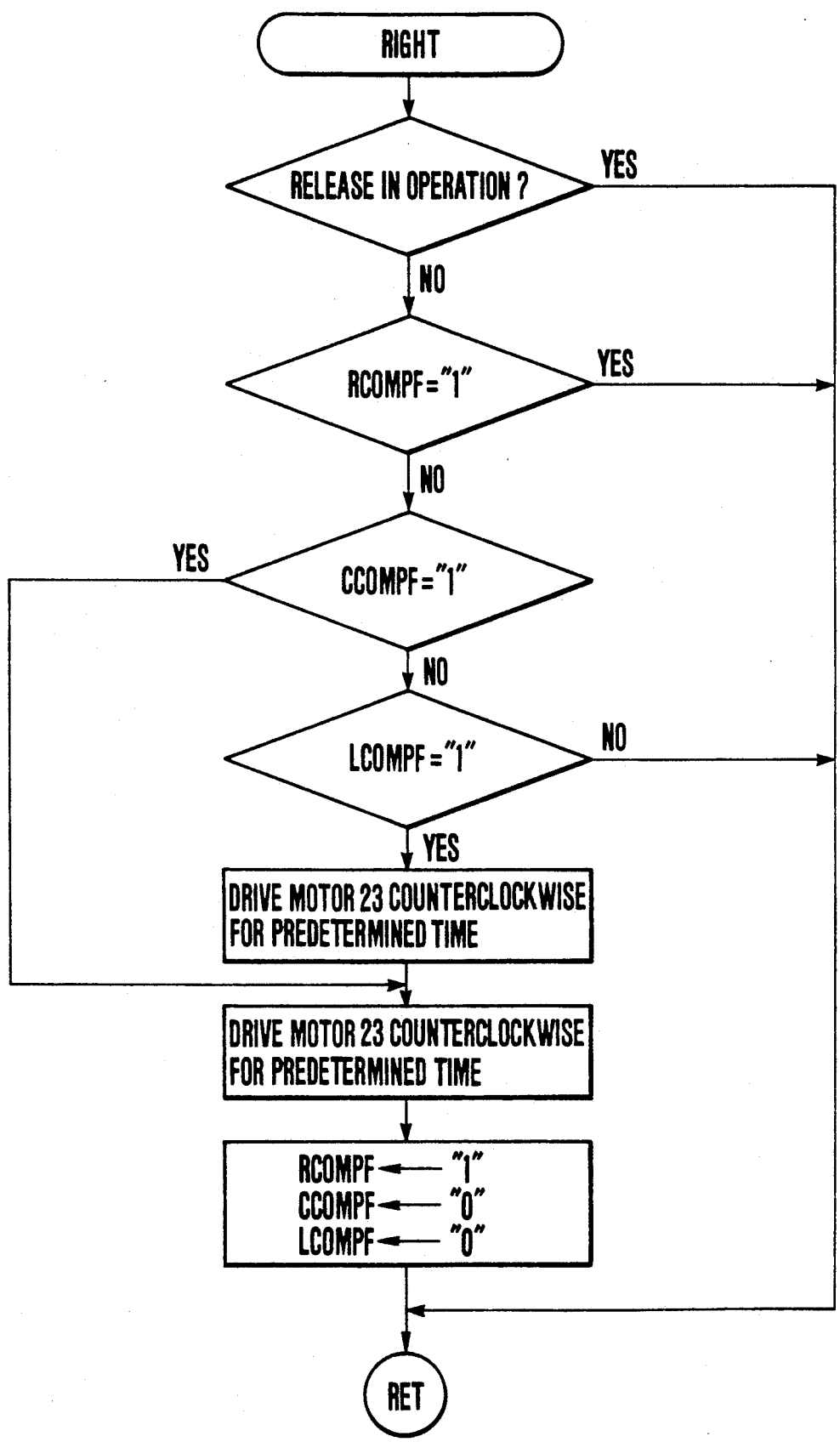
FIG. 11 is a flow chart showing a subroutine RIGHT included in the flow of operation shown in FIG. 9(a).
Figure 12:
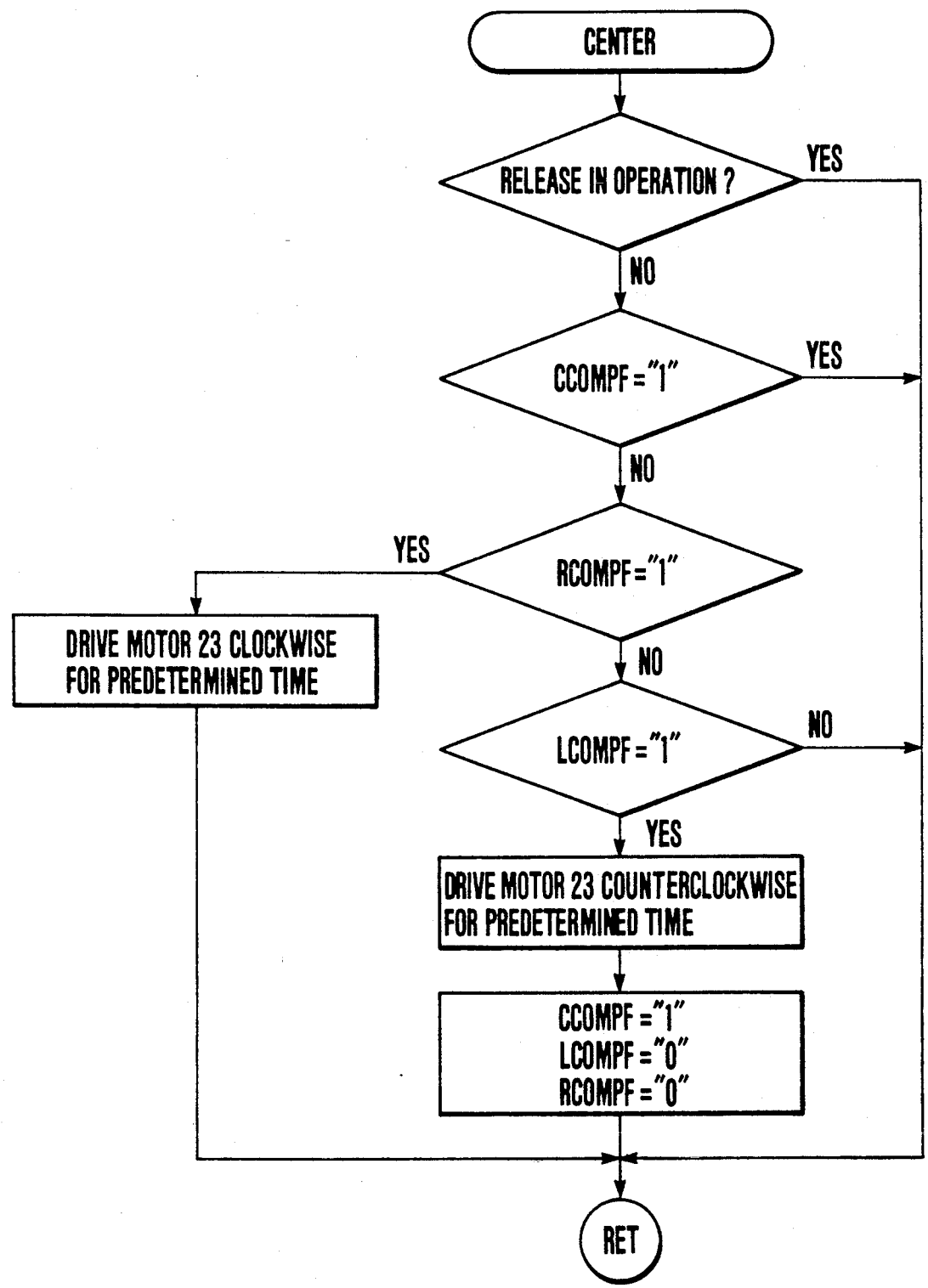
FIG. 12 is a flow chart showing a subroutine CENTER included in the flow of operation shown in FIG. 9(a).

Further, in FIG. 9(a), words "RELEASE", "LEFT", "CENTER" and "RIGHT" indicate subroutines, which are as shown in FIGS. 10 to 12. In each of these subroutines, "1" means execution while "0" means non-execution.

The following describes operations to be performed when the remote-control operator operates the wireless remote-control device.

(i) In taking a photograph with the object on the left side of the picture plane as shown in FIG. 8(b):

The wireless remote-control operator pushes the button B1 to close the switch SW1. Then, the signal transmitted from the wireless remote-control device 4 causes the decoder 36 of the signal receiving device 3 to generate the code "100". Therefore, the microcomputer 11 detects the code "100" at the step S3 and executes the control operation of the subroutine LEFT as shown in the flow chart of FIG. 10. In the subroutine LEFT shown in FIG. 10, the states of the flags LCOMPF, CCOMPF and RCOMPF are determined at steps S21 to S23 respectively. After the states of these flags are determined, the flow comes to a step S25. At the step S25, the camera body part 1 is slightly turned to a given extent around the vertical axis Z-Z' by causing the motor 23 to rotate clockwise to a given extent. As a result, there obtains a state as shown in FIG. 8(b).

More specifically, since the automatic tracking action has been completed, the flag CCOMPF has been set at "1" at the step S14 of FIG. 9(b). Meanwhile, the flags LCOMPF and RCOMPF are in a state of having been reset by an initializing action at the step S1. Therefore, the state of the flag CCOMPF is detected to be "1" at the step S22. The flow comes to the step S25 to cause the motor 23 to rotate clockwise for a given period of time (to a given extent) in such a way as to shift the state of FIG. 8(a) to the state of FIG. 8(b).

After the step S25, when the remote-control operator pushes the button B4 to close the switch SW4, the microcomputer 11 sends a release signal to the shutter control circuit which is not shown to cause the latter to make a shutter release.

(ii) In taking a photograph with the object on the right side of the picture plane as shown in FIG. 8(c):

The wireless remote-control operator pushes the button B3 to close the switch SW3. The decoder 36 which is disposed within the signal receiving device 3 then generates an output indicating the code "001". The microcomputer 11 performs the control operation of the subroutine RIGHT in accordance with the flow chart of FIG. 11 in the following manner. Like in the case of the subroutine LEFT described in the foregoing, the states of the flags LCOMPF, CCOMPF and RCOMPF are determined. After the determining process, the camera body part 1 is caused to turn counterclockwise on the vertical axis Z-Z' by rotating the motor 23 counterclockwise to a given extent in such a way as to bring about the state of FIG. 8(c). After this process, a shutter release is made when the button B4 is pushed by the wireless remote-control operator.

(iii) In taking a photograph with the object in the center of the picture plane as shown in FIG. 8(a):

In a case the object is not in the center of the picture plane, the button B2 is pushed to close the switch SW2. With the switch SW2 closed, the decoder 36 generates an output indicating the code "010". The microcomputer 11 performs an operation which is as represented by the flow chart of FIG. 12. As a result, the motor 23 is rotated either clockwise or counterclockwise to bring the picture plane into a state which is as shown in FIG. 8(a). With the picture plane brought into the state of FIG. 8(a), the wireless remote-control operator pushes the button B4 for taking a photograph.

In this instance, the flag RCOMPF or LCOMPF is set at "1", because the above-stated subroutine RIGHT or LEFT has been executed with the button B1 or B3 pushed before the button B2 is pushed. Therefore, when the subroutine CENTER is executed with the button B2 pushed, the motor 23 is rotated clockwise or counterclockwise to a given extent to cause the picture plane to be shifted to the state of FIG. 8(a) from the state of FIG. 8(b) or FIG. 8(c).

In a case where the axis of the lens barrel of the camera has already been adjusted to the center of the object by automatic tracking, the remote-control operator is required only to just push the button B4.

What is claimed is:

1. A photographing system having a remote-control device and a camera which is controllable with a signal coming from said remote-control device, comprising:
    a) a signal receiving circuit part arranged to receive a signal from said remote-control device;
    b) a driving circuit arranged to detect an incoming flight direction of the signal from said remote-control device and to direct a photo-taking optical system of said camera to the incoming flight direction of the signal; and
    c) a control circuit arranged to direct the photo-taking optical system to a predetermined direction designated by the signal received by said signal receiving circuit part from said remote-control device irrespectively of the incoming flight direction of the signal.

2. A system according to claim 1, wherein said signal receiving circuit part is arranged to detct an incident position of the signal coming from said remote-control device, and wherein said driving circuit is arranged to control a facing direction of the photo-taking optical system in such a way as to make the incident position coincide with a given position.

3. A system according to claim 2, wherein said signal receiving circuit part is disposed at said camera.

4. A system according to claim 1, wherein said control circuit is arranged to operate in response to a signal transmitted from said remote-control device after the photo-taking optical system is directed to the incoming flight direction of the signal by said driving circuit.

5. A photographing system having a remote-control device and a camera which is controllable with a signal coming from said remote-control device, comprising:
    a) a signal receiving circuit part arranged to receive a signal sent from said remote-control device; and
    b) a control circuit having a first mode in which said control circuit detects an incoming flight direction of the signal from said remote-control device and controls a facing direction of a photo-taking optical system of said camera on the basis of the detected incoming flight direction and a second mode in which said control circuit controls the facing direction of the photo-taking optical system of said camera to a direction designated by the signal from said remote-control device irrespectively of the incoming flight direction of the signal.

6. A system according to claim 5, wherein said control circuit includes a setting circuit arranged to judge a form of the signal received by said signal receiving circuit part and to set said control circuit in the second mode when the signal received is judged to be a specific signal.

7. A system according to claim 6, wherein said setting circuit is arranged to set said control circuit in the second mode when the specific signal is received by said signal receiving circuit part after completion of control over the facing direction of the photo-taking optical system in the first mode.

8. A system according to claim 7, wherein said control circuit includes a first driving signal forming circuit arranged to detect the incoming flight direction of the signal from said remote-control device and to form a first driving signal for driving the photo-taking optical system in the incoming flight direction of the signals, a second driving signal forming circuit arranged to form a second driving signal for driving, to a given extent, the photo-taking optical system to shift the driving direction of the photo-taking optical system to a predetermined direction when the signal from said remote-control device is the specific signal, a driving circuit arranged to change the driving direction of the photo-taking optical system in response to the first or second driving signal, and a switching circuit arranged to transmit the first driving signal to said driving circuit when said control circuit is in the first mode and to transmit the second driving signal to said driving circuit when said control circuit is in the second mode.

9. A system according to claim 6, wherein said signal receiving circuit part includes a sensor part arranged to detect a position of the received signal and a judging circuit part arranged to judge the form of the received signal, and wherein said control circuit is arranged to detect the incoming flight direction of the signal on the basis of the position detected by said sensor part and to control a mode setting action-of said setting circuit to the second mode on the basis of the signal form judged by said judging circuit part.

10. A camera system arranged to be controllable on the basis of a signal from a remote-control device, comprising:
    a) a signal receiving circuit part arranged to receive a signal sent from said remote-control device; and
    b) a control circuit having a first mode in which said control circuit detects an incoming flight direction of the signal from said remote-control device and controls a facing direction of a photo-taking optical system of said camera on the basis of the detected incoming flight direction and a second mode in which said control circuit controls the facing direction of the photo-taking optical system of said camera to a direction designated by teh signal from said remote-control device irrespectively of the incoming flight direction of the signal.

11. A system according to claim 10, wherein said control circuit includes a setting circuit arranged to judge a form of the signal received by said signal receiving circuit part and to set said control circuit in the second mode when the signal received is judged to be a specific signal.

12. A system according to claim 11, wherein said setting circuit is arranged to set said control circuit in the second mode when the specific signal is received by said signal receiving circuit part after completion of control over the facing direction of the photo-taking optical system in the first mode.

13. A system according to claim 12, wherein said control circuit includes a first driving signal forming circuit arranged to detect the incoming flight direction of the signal from said remote-control device and to form a first driving signal for driving the photo-taking optical system in the incoming flight direction of teh signals, a second driving signal forming circuit arranged to form a second driving signal for driving, to a given extent, the photo-taking optical system to shift the driving direction of the photo-taking optical system to a predetermined direction when the signal from said remote-control device is the specific signal, a driving circuit arranged to change the driving direction of the photo-taking optical system in response to the first or second driving signal, and a switching circuit arranged to transmit the first driving signal to said driving circuit when said control circuit is in the first mode and to transmit the second driving signal to said driving circuit when said control circuit is in the second mode.

14. A system according to claim 11, wherein said signal receiving circuit part includes a sensor part arranged to detect a position of the received signal and a judging circuit part arranged to judge the form of the received signal, and wherein said control circuit is arranged to detect the incoming flight direction of teh signal on the basis of the position detected by said sensor part and to control a mode setting action of said setting circuit to the second mode on the basis of the signal form judged by said judging circuit part.

* * * * *

UNITED STATES PATENT AND TRADEMARK OFFICE
CERTIFICATE OF CORRECTION

PATENT NO. : 5,223,875
DATED      : June 29, 1993
INVENTOR(S) : Masaru Yanagisawa It is certified that error appears in the above-identified patent and that said Letters Patent is hereby corrected as shown below:

```
Col. 2, line 63.    Change "an" to -- a --
Col. 3, line 7.     After "person" insert -- , --
Col. 3, line 56.    Change "6(b)" (second occurrence) to --
                    6(c) --
Col. 4, line 68.    Change "5(b)" to -- 5(c) --
Col. 5, line 45.    Change "is" to -- are --
Col. 7, line 5.     Change "tents" to -- tent --
Col. 7, line 5.     Change "motor" to -- motors --
Col. 8, line 13.    Change "slightly" to -- slightly --
Col. 8, line 52.    After "case" insert -- where --
Col. 10, lines 41, 61. Change "teh" to -- the --
Col. 12, line 3.    Change "teh" to -- the --
```

Signed and Sealed this

Twenty-second Day of February, 1994

Attest:

BRUCE LEHMAN

Attesting Officer

Commissioner of Patents and Trademarks